April 23, 1940.                R. W. CHAPMAN                2,198,244
                           DETACHABLE BOX HANDLE
                           Filed Feb. 21, 1939
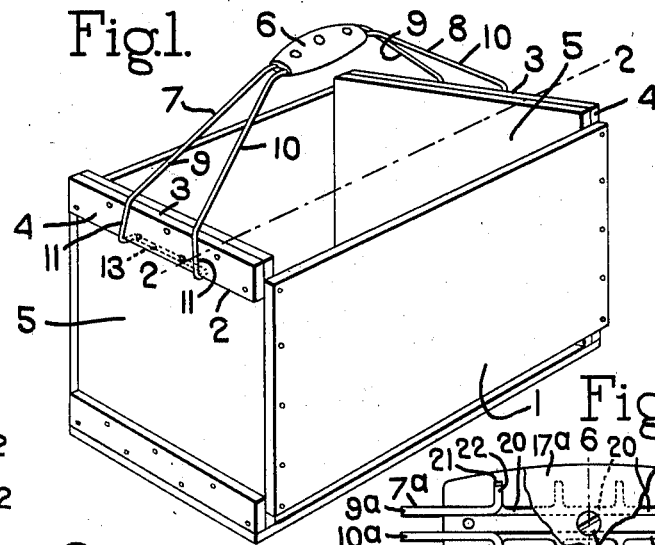
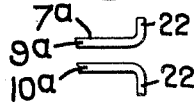
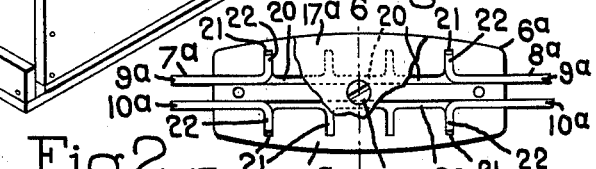
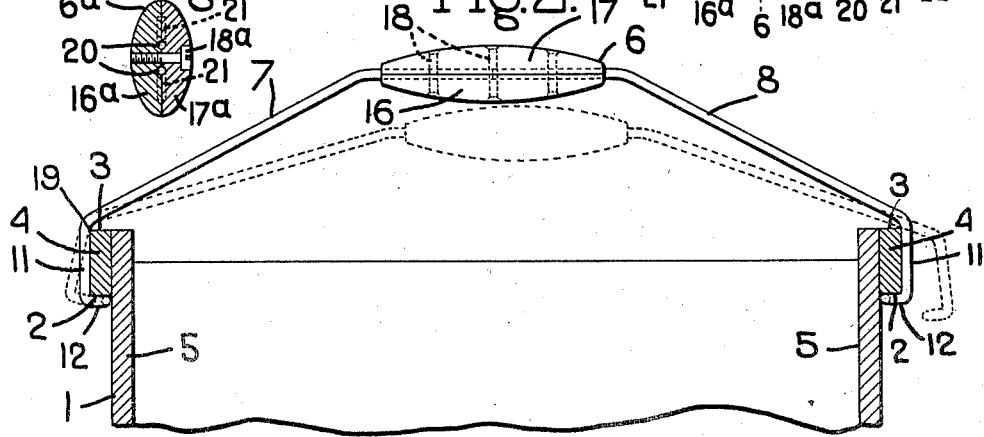
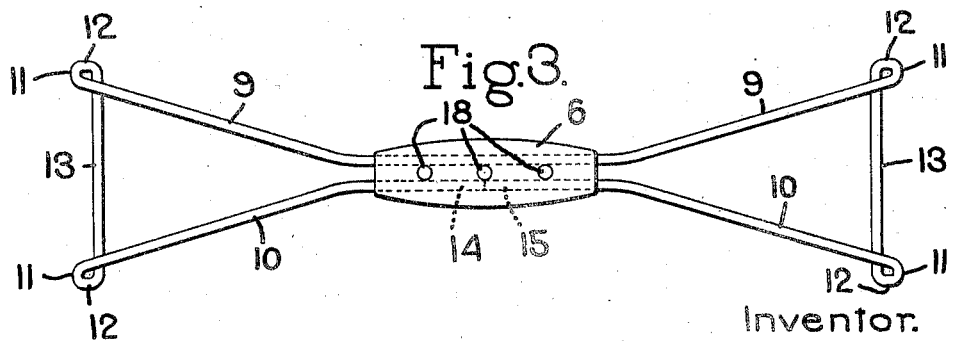
Inventor.
Ralph W. Chapman
by Heard Smith & Tennant.
                    Attys.

Patented Apr. 23, 1940

2,198,244

UNITED STATES PATENT OFFICE 2,198,244

DETACHABLE BOX HANDLE

Ralph W. Chapman, Old Town, Maine, assignor to Wilfred A. Finnegan, Bangor, Maine Application February 21, 1939, Serial No. 257,621

3 Claims. (Cl. 294—16)

This invention relates to handles for boxes and particularly to handles which are detachable from the box and which may be applied to the box when it is desired to transport the box from one place to another and can be detached from the box when the latter has been carried to its desired destination. My improved handle is designed to be used with a box which is provided on each of two opposite sides or opposite ends with a downwardly facing shoulder with which the handle is adapted to have engagement.

In order to give an understanding of my invention, I have illustrated it herein as it might be applied to a box such as is adapted to be used for storing or transporting fruits or vegetables such as apples or potatoes, but I wish to state that the invention is equally applicable to boxes designed for other purposes.

One of the objects of the invention is to provide an improved detachable handle for a box, which is so constructed that the application thereof to the box for transporting the latter will not mar or injure the box in any way.

A further object of the invention is to provide an improved detachable handle for a box which is provided at its ends with shoulder-engaging portions adapted to engage the downwardly-facing shoulders of the box, and which is further constructed so that when it is desired to remove the handle from the box, these shoulder-engaging portions can be disconnected from the shoulders by exerting a downward force on the hand-gripping portion of the handle.

Further objects of the invention are to improve detachable handles for boxes in various particulars which will be more fully hereinafter set forth.

In the drawing wherein I have illustrated a selected embodiment of my invention;

Fig. 1 is a perspective view of a box having my improved handle thereto;

Fig. 2 is an enlarged section on the line 2—2, Fig. 1, showing the manner in which the handle engages the box, and also illustrating in dotted lines the manner in which the handle may be removed from the box;

Fig. 3 is a top plan view of the handle;

Fig. 4 is a plan view with parts broken out showing a construction in which the arms are adjustably secured to the hand-hold portion;

Fig. 5 is a fragmentary view of the inner end of one of the arms;

Fig. 6 is a section on the line 6—6, Fig. 4.

As stated above, my improved handle is designed to be used with boxes that are formed on each of two opposite sides or opposite ends with a downwardly-facing shoulder situated near the top of the box, and in the drawing, such a box is indicated at 1. This box may be made of any suitable material, but will preferably be made of wood, and it is formed on the outer face of each end with a downwardly-facing shoulder 2 which is located adjacent the top edge of the box. Such downwardly-facing shoulder may be constituted by the lower edge of a cleat 4 which is secured to the outside of the end wall 5 of the box, or said downwardly-facing shoulder might be formed by providing the opposite end walls 5 of the box with grooves. A box of this type makes an excellent box for storing or transporting apples, potatoes and other similar food products.

My improved handle comprises a central handhold portion 6 adapted to be grasped in the hand, and two arms 7 and 8 extending in opposite directions from said handhold portion of a length to span the top of the box. Each arm is provided at its outer end with a shoulder-engaging portion adapted to engage one of the downwardly-facing shoulders of the box.

In the construction herein shown, each arm member 7, 8 of the handle is formed with two arm sections 9 and 10, such arm sections extending from the handhold portion 6 and having a somewhat divergent arrangement. Each arm 7 and 8 has a downward inclination from the handhold portion, and each arm section 9 and 10, is provided at its outer end with a vertically extending portion 11 which has a vertical dimension substantially equal to the distance between the downwardly-facing shoulder and the top edge 3 of the box. At the lower end of each vertically-extending portion is an inwardly-directed shoulder-engaging portion 12 which is adapted to extend under and engage the downwardly facing shoulder 2 of the box. In the preferred embodiment of my invention, the inner ends of the inwardly-directed portions 12 are connected by a straight integral member 13 which extends underneath and contacts with the shoulder 2.

The improved handle may conveniently, though not necessarily, be made from a single length of wire of the proper size and stiffness. When so made, the wire is bent, commencing at one end thereof, to form the straight central portion 14 (see Fig. 3), and then the arm section 10 which merges at its outer end into one of the vertical portions 11, the wire at the lower end of the portion 11 being bent inwardly to form the inwardly directed shoulder-engaging portion 12, and said wire being further bent to form the connecting portion 13 which leads to the inner end of the shoulder-engaging portion 12 of the arm section 9, said wire being further bent to form the vertical portion 11 of the arm section 9 and said arm section itself. The wire then continues across the center of the handle and is bent to form the sections 9 and 10, and other parts of the arm 8, the end 15 of the wire being brought into line with the end 14 thereof. The handle grip or handhold 6 is shown as comprising two sections 16 and 17 which enclose the central portion of the handle and which are riveted together by means of suitable rivets 18. Any other suitable handhold construction may be employed, however, without departing from the invention.

When the handle is applied to the box, as shown in Figs. 1 and 2, the vertical portions 11 engage the outer faces of the cleats 4 and the shoulder-engaging portions 12, and the connecting members 13 engage the under faces 2 of the cleats, which are the downwardly-facing shoulders of the box. The arm sections 9 and 10 of the arms also engage the top edge of the box at the angle 19 where the arm sections 9 or 10 merge into the vertical portions 11, as best seen in Fig. 2. When the box is lifted or carried by the handle, the strain on the handle tends to increase the grip of the end portions thereof on the cleats 4 and the downwardly-facing shoulders 2.

When it is desired to remove the handle from the box, a downward and endwise pressure is applied to the handle grip 6, and as the latter is depressed into the dotted line position, Fig. 2, the arms 7 and 8 will have a fulcruming action on the upper edge of the box at the points 19 where said arms engage the corner of the box. This fulcruming action causes the vertical portions 11 of the arms to swing outwardly into the dotted line position, thereby disengaging the shoulder-engaging portions 12 and connections 13 from the downwardly-facing shoulders 2. Such downward pressure on the handle grip portion will serve to partially straighten the handle thereby increasing the distance between the ends of the handle. If during the application of the downward pressure on the hand-hold one end of the handle is held in engagement with the end of the box, as shown at the left, in Fig. 2, the partial flattening of the handle will cause the arm 8 to have a slight fulcruming engagement with top edge of the box at the right hand thereof, as shown by dotted lines, Fig. 2, thus spreading the handle lengthwise and separating the vertical portions 11 and shoulder-engaging portions 12 at said end of the handle from the box. By maintaining the handle in the dotted line position (Fig. 2) with one of the shoulder-engaging portions in contact with the end of the box and then swinging the handle upwardly, the handle will be easily disconnected from the box by the use of one hand only.

Where the box to which the handle is to be applied is of the type having the cleats 4 as herein illustrated, the handle may also be removed by sliding lengthwise of the cleats until the shoulder engaging portions are carried off from the ends of the cleats.

The handle may be easily applied to the box by placing the shoulder-engaging portions 12 and 13 at one end of the handle in engagement with the corresponding downwardly-facing shoulder 2 and then bringing the other end of the handle against the top edge of the box and applying a downward pressure to the handle, which will straighten the handle somewhat and thereby elongate it sufficiently so that the shoulder-engaging portions 12 and 13 at the other end of the handle can snap over the cleat.

The construction of the shoulder-engaging portions 12 and connecting portions 13 is such that their engagement with downwardly-facing shoulder does not injure or mark the box in any way, and, therefore, a handle embodying my invention can be repeatedly applied to or removed from a box without causing any injury to the latter.

The handle shown in Figs. 1 to 3 has a fixed length and would be suitable for use with a box of a given size only.

In Figs. 4 and 5, I have illustrated a construction wherein the handle is adjustable as to its length so that it can be extended or contracted within certain limits to enable it to be used on boxes of different sizes. In Fig. 4, which shows the hand-hold position 6a of the handle and adjoining portions only of the arm members 7a, 8a, each arm has the two arm sections 9a and 10a that are preferably made of wire as in the construction shown in Figs. 1 to 3.

In the embodiment shown in Fig. 4, however, the two arms are separate and each is adjustably secured to the hand-hold member 6a so that it can be adjusted relative thereto in the direction of its length. The hand-hold member comprises the two sections 16a, 17a, between which the inner ends of the handles are clamped and each section is provided with a groove 20 to receive the arm sections 9a, 10a, and with a plurality of laterally extending recesses 21 extending outwardly from each of the grooves. Each arm section 9a, 10a is bent laterally as shown at 22, said laterally bent portions being adapted to be received in certain of the recesses. The two sections 16a, 17a of the hand-hold member are clamped together by means of clamping screws 18a, and when so clamped, the arms 7a, 8a will be securely locked to the hand-hold portion.

In the construction shown in Fig. 4, there are four such recesses 21 extending outwardly from each groove 20. When the arms 7a, 8a are assembled with the hand-hold portion with the laterally extending fingers 22 occupying the end recesses 21 as shown in Fig. 4, the handle will have its maximum length.

If it is desired to shorten the handle for use on a shorter box, then the screws 18a will be backed off and the two parts of the hand-hold portion may be separated sufficiently to permit the laterally extending fingers 22 to be placed in recesses 21 nearer the center of the handle, and when the desired adjustment has been made, then the two parts of the hand-hold are clamped together again, thereby rigidly uniting the arms and the hand-hold portion.

While I have illustrated herein a handle in which the arms are made of wire, yet the arms might be made of other material than wire without in any way departing from the invention.

I claim:

1. A detachable box handle, for a box having downwardly facing shoulders at opposite ends near the top of the box, comprising a central horizontal hand-hold portion with box-engaging members extending from the opposite ends thereof in the general direction of the length of said hand-hold, each of said members comprising resilient metal arms diverging laterally and downwardly relatively to the axis of the hand-hold and having near their lower ends downwardly extending vertical portions of a length at least equal to the distance of the shoulder on the box from the top thereof, the ends of said vertical portions being bent inwardly and integrally connected by a horizontal member extending at right angles to the vertical axial plane of the hand-hold member adapted slidably to engage beneath the shoulder of the box.

2. A detachable box handle, for a box having downwardly facing shoulders at opposite ends near the top of the box, comprising a central hand-hold formed in complementary generally semi-cylindrical sections secured together, each of said sections having parallel internal channels extending longitudinally thereof, resilient metal arms of generally triangular form extending from the opposite ends of said hand-hold in the general direction of the length of said hand-hold having parallel sections mounted in the channels of said hand-hold and diverging laterally and downwardly from the ends of said hand-hold relatively to its axis and having near their lower ends portions of a length at least equal to the distance of the shoulders on the box from the top thereof bent vertically downwardly and then offset inwardly to provide a horizontal section adapted slidably to engage beneath the shoulder of the box.

3. A detachable box handle, for a box having downwardly-facing shoulders on opposite ends near the top, comprising a central hand-hold portion and two arms extending in opposite directions from the ends therefrom, each arm comprising two arm sections having at their outer ends shoulder-engaging portions adapted to engage the downwardly-facing shoulders, said hand-hold portion being made in two rigidly connected but separable complementary parts between which the inner ends of the arm sections are clamped, each arm section having at its inner end laterally extending fingers and the parts of the hand-hold member having complementary recesses to receive said fingers.

RALPH W. CHAPMAN.